United States Patent
Jardine

(10) Patent No.: US 9,010,106 B2
(45) Date of Patent: Apr. 21, 2015

(54) FAST RESPONSE, OPEN-CELLED POROUS, SHAPE MEMORY EFFECT ACTUATORS WITH INTEGRATED ATTACHMENTS

(75) Inventor: Andrew Peter Jardine, Thousand Oaks, CA (US)

(73) Assignee: Shape Change Technologies LLC, Thousand Oaks, CA (US)

( * ) Notice: Subject to any disclaimer, the term of this patent is extended or adjusted under 35 U.S.C. 154(b) by 0 days.

(21) Appl. No.: 13/475,931

(22) Filed: May 18, 2012

(65) Prior Publication Data
US 2014/0157768 A1 Jun. 12, 2014

Related U.S. Application Data

(60) Provisional application No. 61/520,624, filed on May 18, 2011.

(51) Int. Cl.
F03G 7/06 (2006.01)
(52) U.S. Cl.
CPC ....................................... *F03G 7/065* (2013.01)
(58) Field of Classification Search
CPC .................................... F03G 7/065; F03G 7/06
USPC ............. 60/527–529; 148/527, 563; 138/108, 138/110, 149; 92/21 R, 115, 27, 28, 32, 92/134; 521/159, 155, 161, 170
See application file for complete search history.

(56) References Cited

U.S. PATENT DOCUMENTS

| | | | | |
|---|---|---|---|---|
| 3,519,708 A | * | 7/1970 | McMichael | 264/321 |
| 5,093,384 A | * | 3/1992 | Hayashi et al. | 521/159 |
| 5,986,169 A | * | 11/1999 | Gjunter | 424/422 |
| 7,274,128 B1 | * | 9/2007 | Liu et al. | 310/300 |
| 7,538,472 B2 | * | 5/2009 | Browne et al. | 310/311 |
| 7,591,834 B2 | * | 9/2009 | Buckley et al. | 606/209 |
| 7,648,589 B2 | * | 1/2010 | Taya et al. | 148/402 |
| 7,926,565 B2 | * | 4/2011 | Duan et al. | 166/278 |
| 8,192,563 B2 | * | 6/2012 | Clark et al. | 148/527 |
| 8,651,451 B2 | * | 2/2014 | Hong et al. | 251/11 |
| 8,652,621 B2 | * | 2/2014 | Weigel et al. | 428/212 |
| 2004/0191556 A1 | * | 9/2004 | Jardine | 428/610 |
| 2004/0226099 A1 | * | 11/2004 | Pearce | 5/655.5 |
| 2008/0296020 A1 | * | 12/2008 | Willauer | 166/280.1 |
| 2009/0296020 A1 | * | 12/2009 | Chen et al. | 349/64 |
| 2010/0102093 A1 | * | 4/2010 | Ham et al. | 222/420 |
| 2010/0221124 A1 | * | 9/2010 | Ikushima et al. | 417/44.2 |
| 2010/0314258 A1 | * | 12/2010 | Cohen et al. | 205/188 |

OTHER PUBLICATIONS

Fast-Response-Time Shape-Memory-Effect Foam Actuators, Author, John H Glenn Research Center Cleveland, Ohio.*

* cited by examiner

*Primary Examiner* — Thomas Denion
*Assistant Examiner* — Shafiq Mian
(74) *Attorney, Agent, or Firm* — SoCal IP Law Group LLP; Jonathan Pearce

(57) ABSTRACT

This invention relates to the exploitation of porous foam articles exhibiting the Shape Memory Effect as actuators. Each foam article is composed of a plurality of geometric shapes, such that some geometric shapes can fit snugly into or around rigid mating connectors that attach the Shape Memory foam article intimately into the load path between a static structure and a moveable structure.

The foam is open-celled, composed of a plurality of interconnected struts whose mean diameter can vary from approximately 50 to 500 microns. Gases and fluids flowing through the foam transfer heat rapidly with the struts, providing rapid Shape Memory Effect transformations. Embodiments of porous foam articles as torsional actuators and approximately planar structures are disposed. Simple, integral connection systems exploiting the ability to supply large loads to a structure, and that can also supply hot and cold gases and fluids to effect rapid actuation are also disposed.

22 Claims, 11 Drawing Sheets

FAST RESPONSE, OPEN-CELLED POROUS, SHAPE MEMORY EFFECT ACTUATORS WITH INTEGRATED ATTACHMENTS

CROSS REFERENCE TO RELATED APPLICATIONS

This application claims the benefit of PPA filing 61/520,624, filed May 18, 2011, by the present inventor.

FEDERALLY SPONSORED RESEARCH

The invention was made with the U.S. Government support under contact numbers NNX09CC74P and NNX10CACA30C awarded by the National Aeronautics and Space Administration (NASA) Glenn Research Center Small Business Innovation Research (SBIR) program. The U.S Government has certain rights in the invention.

SEQUENCE LISTING

None

BACKGROUND

The following is a tabulation of some prior art that presently appears relevant.
Gjunter V. E, Patent Date Nov. 16, 1999 U.S. Pat. No. 5,986,169
Mabe, J. H., Calkins F. T. et al, Patent Date Jun. 29, 2007, U.S. Pat. No. 7,878,459
Moigenier, P. Chenut G., Patent Date 5 Nov. 2, 1999, U.S. Pat. No. 5,975,468
Jacot et al, Patent Date Aug. 10, 2002 U.S. Pat. No. 4,798,051
Jacot et al, Patent Date Feb. 27, 1998, U.S. Pat. No. 6,065,934
Swenson, S. Patent Date Feb. 7, 1991, U.S. Pat. No. 5,127,228
Bansiddhi A., Dunand D. C., J. Mat. Res., 24 (2009) 2107-2117
Bansiddhi A., Dunand D. C. Intermetallics, 15 (2007) 1612-1622
Wen, C. E., Xiong J. Y., Li Y C, and Hodgson P D, Phys. Scr., T139, (2010) 1-7
Qidwai M. A., et al, Int. J. Solids Structures, 38, (2001), 8633-8671

Shape Memory Effect Actuators (SMAs), composed in particular of Nickel Titanium (TiNi) or Nitinol and its tertiary alloys (TiNi—Cu, Nb, Hf), have had limited applicability in large force actuator applications. There are several reasons for this, such as cost, difficulty in attaching the SMA element and finally slow cycle times. The latter is due to the Shape Memory Effect being a first-order phase transformation between a low temperature martensitic phase and a high temperature austenitic phase, and so actuation is done by heating and cooling a Nitinol shape. For most small force applications of less than 100 gms, the high resistivity of Nitinol as a drawn wire means that joule heating can be used to heat the wire provided that the current draw is practical. Cooling is done passively, either by cooling in gas or a fluid. This has limited the applications to small diameter wires. Electrical current requirements are generally less than 1 Ampere and consequently heating and cooling times are reasonably quick, taking several seconds for 0.003" diameter wire and up to 30 to 60s for 0.020" diameter wire.

As the required actuation force increases, so does the cross-sectional area of the TiNi SMA element, consequently the cyclic response times of the actuators can be in the order of minutes. Heating must be done indirectly, either by wrapping heater wire around the SMA article, heating tape or other hot element, and this dramatically increases the response time of the actuator. For example, a 0.060" thin walled tube will take several minutes to heat and significantly more time to cool, reducing their applicability.

To generate large actuation forces with a fast response time, there have been attempts to use bundles of thin TiNi wires to generate the force but keep the actuation cycle times small. (The most common form of TiNi or other SME alloy is as drawn wire that is commercially available from a variety of suppliers.) This approach has been limited in several ways:
1. TiNi wires are very difficult to bond either by adhesives, welding or mechanically, such as by crimping, and so as the number of thin wires increases as the actuation forces increase, the complexity and cost increases and the overall reliability of the joint decreases.
2. TiNi as a material is expensive, and so these bundled actuators become increasingly expensive as the number of wires increases.
3. The mechanical connections to the structure that is to be actuated can be problematic, and under load, be prone to failure.
4. TiNi and its tertiary alloys are difficult to machine, with Electro-Discharge Machining (EDM) and grinding being the two methods that are used. Both techniques are expensive, and so connectors made by machining are expensive.

By fashioning a TiNi actuator article as a open-celled foam, so that heating and cooling fluids can flow easily through the material, and yet the material can be large, the problem of achieving large actuation forces but with a fast response time is elegantly solved.

The manufacture and physical properties of porous shape memory alloys have been described in the literature for over 20 years, starting with Hey and Jardine who described a closed cell TiNi solid made by sintering of Ni and Ti powders. Gjunter in U.S. Pat. No. 5,986,169 described a method of making an open-celled porous TiNi using the technique of High Temperature Self Propagating Synthesis (SHS), which makes TiNi shape memory alloys with a pore size on the order of several hundred microns and foam strut sizes on the order of 100 to 400 microns in diameter. In recent years, there have been many other techniques to manufacture porous TiNi, which are documented by Wen et al. and Bansiddhi. In these expositions, the notion that these foams displayed the Shape Memory Effect is discussed although there has not been any demonstration of the SME nor any attempt to discuss cycle rates.

The SHS technique allows for net-shape TiNi foams to be made. A mold is made that will contain Ni and Ti powders, and Ti and Ni powders are mixed to the desired stiochiometric ratio to allow for the final foam product to exhibit the shape memory effect, typically this is a 50 atomic percent Ti, 50 atomic percent ratio. Additives of tertiary alloys such as Cu, Nb, and others can be added to change the physical characteristics of the shape memory effect.

As described by Gjunter and others, once the powders are inserted into the mold, the powders are pressed to a pressure of 400 to 800 psi and then heated to a desired pre-heat temperature in either an inert gas or vacuum. Once the preheat condition is established, the SHS process is established by a means of locally melting the powder in one location, such as by using a Tungsten filament at 2000° C., and the enthalpy of the reaction is such that it continues to heat surrounding powder to melting, thus generating a self-propagating reaction that consumes the powder. The end physical form of the material is an open-celled foam, as seen in FIG. 1. By varying the process conditions and initial powders, open-celled foams with a strut diameter of several hundred microns can be realized. Open-celled TiNi foams are available in a variety of forms from Shape Change Technologies LLC, Thousand Oaks Calif.

As the SHS is a net-shape process, the molds can be designed to fashion open-celled foam SME actuators that can be designed to supply large actuation forces and strokes that are not available to conventional SME wire or tube actuators. Of particular interest is that the form of the actuator can have ends that are fashioned to be inserted into a complementary mating structure, making structural attachments facile.

Of particular significance, with the small strut diameter, the shape memory effect can be significantly more rapid in foams than in a solid material of comparable actuation force. By utilizing hot and cold fluids or gases under pressure, these fluids and gases can be forced through the open-celled foam which allows for rapid heat transfer and very fast cycle times between hot and cold shapes.

Shape Change Technologies manufactured net-shape TiNi foam torque tubes with rapid Shape Memory Effect actuation. The increase in response time on cooling and cycling times is about an order of magnitude better than non-porous TiNi torque tubes with a cost that is projected to also be an order of magnitude better with batch production.

Of particular interest is that the net-shape nature of the SHS process allows for an elegant solution to the problem of connection of a SMA article that can generate large forces onto an external structure, as well as reducing the need for machining of the article. For example, SMA Foam TiNi torque tubes with integrated hexagonal ends can be made in one step using the SHS process, making attachment simple to an external structure, simply by fashioning the SHS mold so that the hexagonal ends have a tight fit into a hexagonal socket that is mechanically attached to the external structure.

The SMA article can have a variety of forms that can be tailored to match the desired external actuation constraints of available volume, required stroke, connections etc. As such, SMA foam articles can be in the form of tube or solid bars with ends that can be square, hexagonal or more complex geometries if the actuation is accomplished by twisting of the torsional bar or rod. SMA flat sheets with integrated holes can be fashioned if the actuation is required to be a deflection outwards. Finally, the SMA article can be in the form of a helix for large strokes, or in the form of spheres, cylinders, beveled springs and a plethora of other geometries.

Most SMA actuator applications use electrical heating of thin SMA wires as this is a simple and inexpensive means to interface the actuation to a control circuit. Cooling is typically passive, with the heat dissipated in air. For porous foams, a number of techniques can be employed to heat and cool the material, including utilizing the flow of hot and cold fluids, such as gas or liquids, through the pores. Electrical heating by directly heating the SMA article by current can also be performed, although none of the benefits of the heat transfer using hot and cold fluids or gases is realized.

From experimentation, the following has been demonstrated:
1. The Shape Memory Effect was observed and quantified in torsional TiNi foam actuators.
2. The total response time of the effect using hot and cold water is rapid, <5s for a 0.625" OD, 0.375" ID torque tube, a dramatic decrease in cycling time.
3. The initial response time of the torque tube when hot water was added was very fast, certainly less than $1/16^{th}$ second, opening up the possibility of having a sub- 1 Hz bandwidth for a torque tube actuator system.
4. A net-shape torque rod with integrated hexagonal ends has been made. The tube was able to respond rapidly to 83 in-lb of torque, raising it by 1.6° before failing.

ADVANTAGES

Shape Memory Effect actuators made from open-celled TiNi foam allow for the following key advantages:
1. Net-shape manufacture allows for ends that can be precisely fashioned to allow for easy structural connections to an external load.
2. The net-shape manufacture allows for SMA actuator articles to be made in a variety of new forms that have not been previously available, such as tube[s] with integrated hexagonal ends, flat sheet[s] with holes for structural connections etc. The open-celled foam allows for significantly more rapid heat transfer than a similar solid SMA article, allowing for large loads to be actuated rapidly.
3. The net-shape manufacture also allows for a dramatic reduction in machining, which allows for SMA articles to be made inexpensively.
4. Allows for effective heating and cooling using hot and cold gas of varying liquid content and/or hot and cold liquids, as well as indirect or direct electrical heating.

FIGURES

FIG. 1 is a micrograph of the TiNi foam manufactured using the SHS method showing the physical arrangement of struts and their dimensions in a SHS manufactured foam article. The strut diameters vary but are on the order of 150 to 400 microns.

FIG. 2 is a schematic of a first embodiments of a porous torsional actuator, consisting of a central tublar foam element and two contiguous different shapes such that the geometry of these end shapes fits snugly into a mating connector. The inner volume, in this case consisting of a cylindrical void, allows for hot and cold gases and fluids to pass into the central void and pass out through the foam with appropriate valving.

REFERENCE NUMERALS

Figure 1:
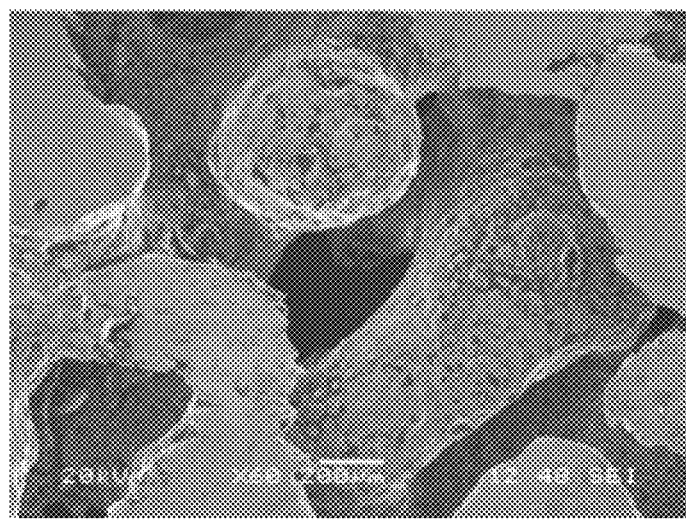

1 A central open-celled porous cylinder of a material exhibiting the shape memory effect.
2 Hexagonally shaped open-celled porous end pieces made from the same material as (1) and contiguous and mechanically coupled to central porous cylinder.
3 The internal volume as defined by the interior volumes of both the central porous cylinder and end pieces.
4 A net-shape porous foam actuator, an integral contiguous assembly of articles (1) and (2).
5 Mating couplers that fit snugly over the ends of the porous foam actuator (4), which also has a coupling to allow for connections to either a static structural element or a moveably structural piece or assembly.
6 Rigid structural components or mechanisms (such as a stiff rod) that allows for a mechanically robust connection from the mating coupler to either a static structural element or a moveably structural piece or assembly.
7 A static structure in which the Shape Memory Effect from the porous tube reacts.
8 A moveable structural element, in this case represented by a reactive torsional member.
9 An orifice into which the hot and cold gases and fluids enter an enclosed volume in the coupler and are forced into the interior volume of the porous foam actuator (4).
10 A source of hot fluids or gases, such that the temperature will result in the forward (cold to hot) transformation in the shape memory effect in the porous foam actuator.
11 A source of cold fluids or gases, such that the temperature will result in the reverse (hot to cold) transformation in the shape memory effect in the porous foam actuator.
12 Externally controlled valves, such as solenoid valves
13 One-way check valves, arranged to prevent the flow of hot fluids into the cold reservoir or vice versa, forcing the fluids or gases through the open-celled foam.
14 A manifold that allows both hot and cold fluids and gases to reach a mating coupler and connects to the hot and cold reservoirs through externally controlled valves and/or check valves.
15 A schematic representation of the flow of pressurized fluids or gases through the porous foam actuator.
16 Cylindrical Tubular body made of an open-celled porous shape memory effect material
17 Hexagonally shaped end pieces for attaching to an external load, which are mechanically continuous to the cylindrical section (16) and may or may not be made from the same porous foam material.
18) Adhesives, such that the bond strength is adequate for the load environment (load strength, speed, temperature profile and cyclic lifetime).
19) A planar porous shape memory piece, that can have a planform such that the material is easily attached to an external structure and communicate actuation force to that structure.
20) The planar porous shape memory article deformed under the application of heat.
21) Holes that allow for attachment to a external static structure
22) The external underlying static structure

DETAILED DESCRIPTION

The invention consists of a open-celled porous Shape Memory Alloy, fashioned to either be as a tube, rod, plate, helix or other geometrical form that can be accommodated to apply force to an external structure. The geometrical form will be the shape that best meets the needs of deflection, required force, form factor and heating and cooling requirements. For the sake of argument, a tubular shape and a planar shape will be discussed.

Figure 2:
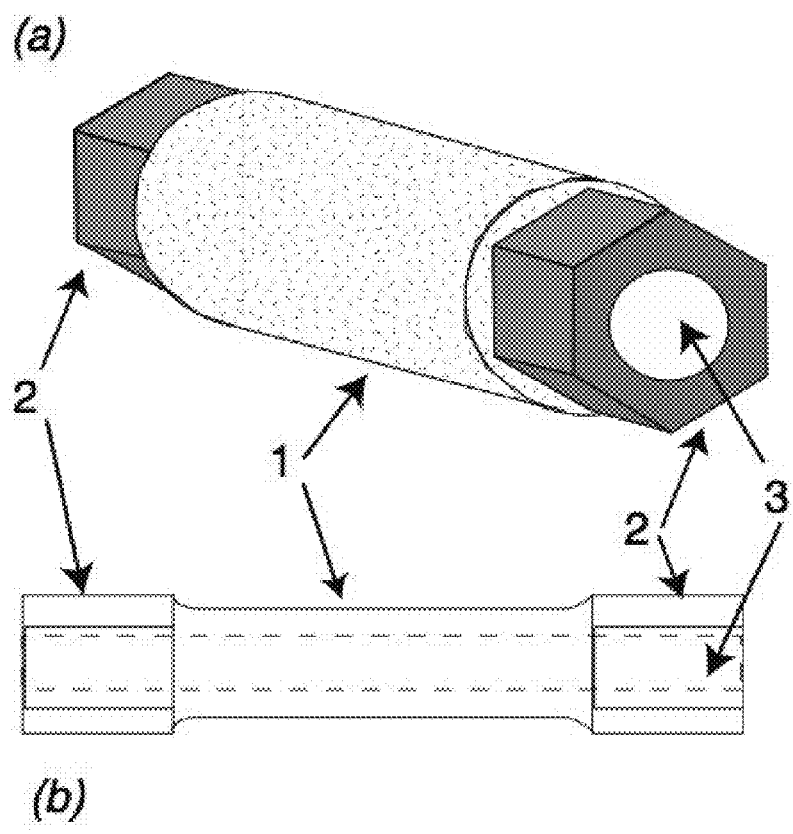

FIG. 2 is a perspective view of one embodiment and a schematic view of a second embodiment of a porous foam torsional actuator. The actuator consists of a central cylinder of porous foam (1) with two contiguous hexagonal pieces (2) that would fit into a complementary hexagonally shaped sockets that connect to an external structure. The actuator has an internal volume (3), so that hot or cold fluids and gases can pass into the structure. This particular embodiment is fashioned as a torque tube, so that in its cold state the material can be easily deformed by twisting, and when heated, the recovery force is realized as a torque.

For fast response times, pressurized hot gas or cold gases or fluids are directed through the center of the tube, so that the gas or fluid is forced out through the pores in the tube, allowing for rapid heat transfer. For maximum deflections, the temperature of the hot gas or fluid is equal to or above the temperature at which the TiNi in the tube is entirely austenitic; similarly the cold gas or fluid supply should be below the temperature at which the TiNi in the tube is entirely martensitic. The greater the temperature difference between the hot gas supply and the relevant transformation temperature, the faster will be the heat transfer and, consequently, the faster will be the response time.

Figure 3:
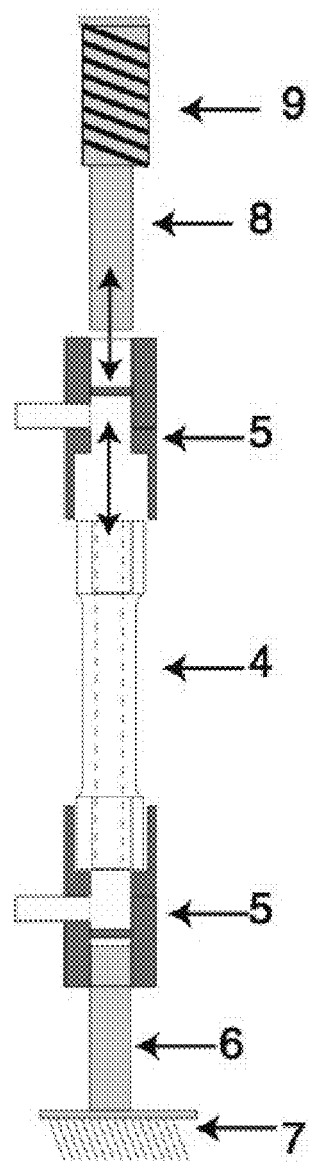
FIG. 3 is a schematic of an embodiment of a structural connection system such that the porous foam actuator is an integral member of the load path between the static structure and a moveable load. The fit between the mating connector and the porous SMA article and the rigid rods is snug, but the parts are easily engaged by sliding the parts together.

FIG. 3 demonstrates schematically several ways to direct hot and cold fluids into the open-celled porous actuator (4), as well as means of attaching the actuator to the load path between a static structural element and structural element that is to be moved. In one embodiment, both contiguous ends of the actuator (4) fit snugly into corresponding mating couplers (5), where one coupler is then attached to a rigid structural mechanism (6) to the static structure (7), with the other mating coupler is attached to another rigid structure (8) that attaches to the moveable structural element (9), in this case represented by a reactive load. The mating coupler contains both a rigid mating socket that fits over the end of the torque tube as well as an element (in this case a square socket) that attaches to a separate rigid structure, which in turn attaches to either the static or moveable structure. Into this mating coupler is attached an orifice (9) that permits gas to flow through the coupler into the tubular porous foam actuator. In this way, the porous foam actuator is both rigidly attached to the load path between the static and moveable structure in a way that is both simple and elegant.

Figure 4:
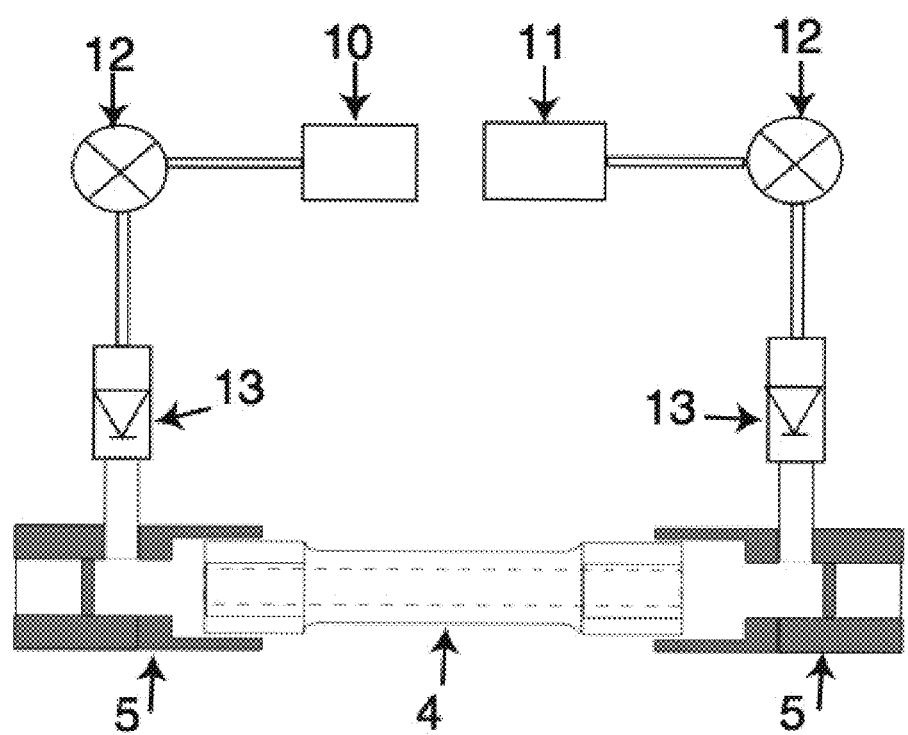
FIG. 4 is a schematic of an embodiment of the valving in which the timing of hot and cold gases or fluids is controlled by external valving and check valves, wherein the pressurized fluids are forced out through the open-celled porous wall of the tube.

FIG. 4 demonstrates the control of the flow of hot and cold by valves that are either externally controlled or passive check valves. In one embodiment, hot (10) or cold (11) fluids are pressurized and flow once a solenoid valve (12) attached to the hot or cold source is activated. Check valves (13) are placed close to the mating couplers (15), and arranged so that if the hot active valve is on, the check valve along the cold line is closed, forcing the hot pressurized fluid through the tube.

Similarly, if the cold active valve is on, the check valve on the hot end of he porous element is off, forcing cold water through the walls of the porous element.

Figure 5:
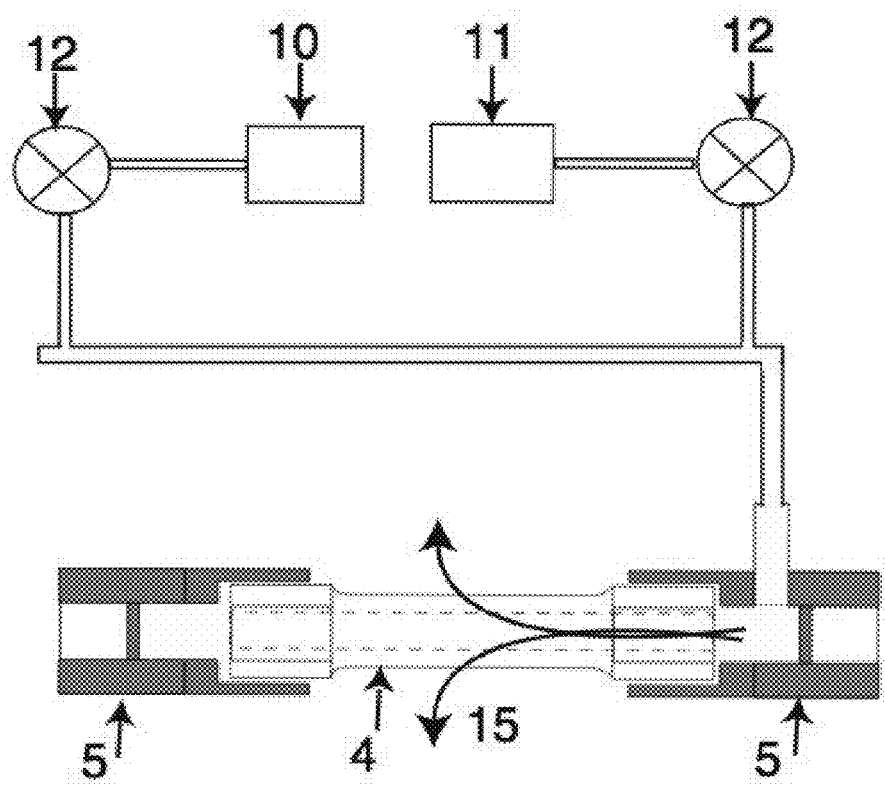
FIG. 5 is a schematic of an alternative embodiment where the hot and cold gases or fluids are introduced into the center of the tube by one mating connector, wherein both hot and cold fluid and gas sources are connected to a central manifold through active solenoid valves.

FIG. 5 demonstrates schematically an alternative way to arrange valving. In one embodiment, there is only one orifice required. This orifice is then connected to a manifold in which at least two externally controlled valves are connected, to control the flow of hot and cold gases or fluids into the internal volume of the actuator. In this embodiment, one end of the actuator is sealed, and so any pressurized gases are forced through the open-celled foam.

Figure 6A:
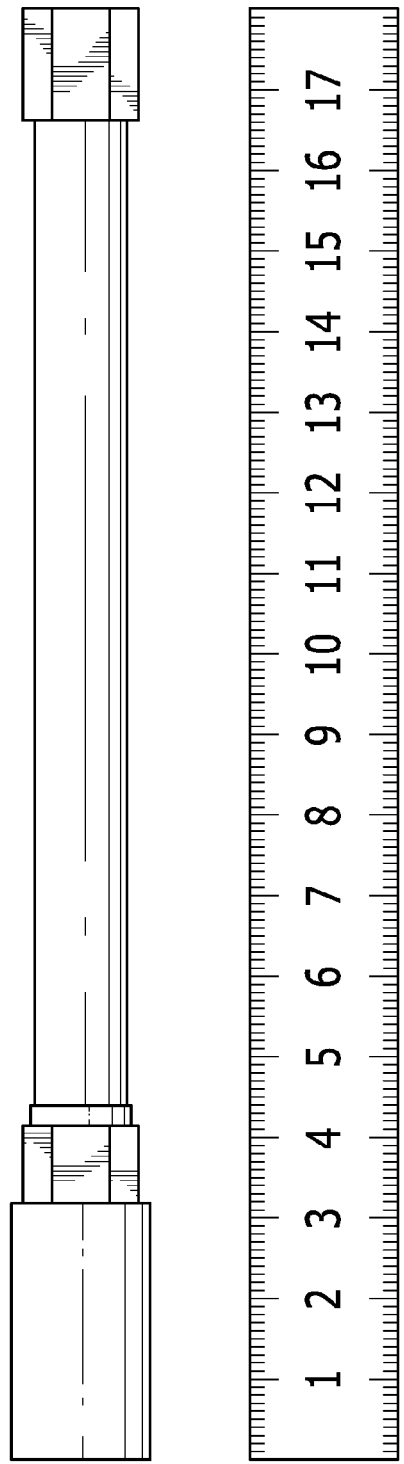
FIG. 6A is a photograph of the porous foam material connected to an external structure via several hexagonal sockets.
Figure 6B:
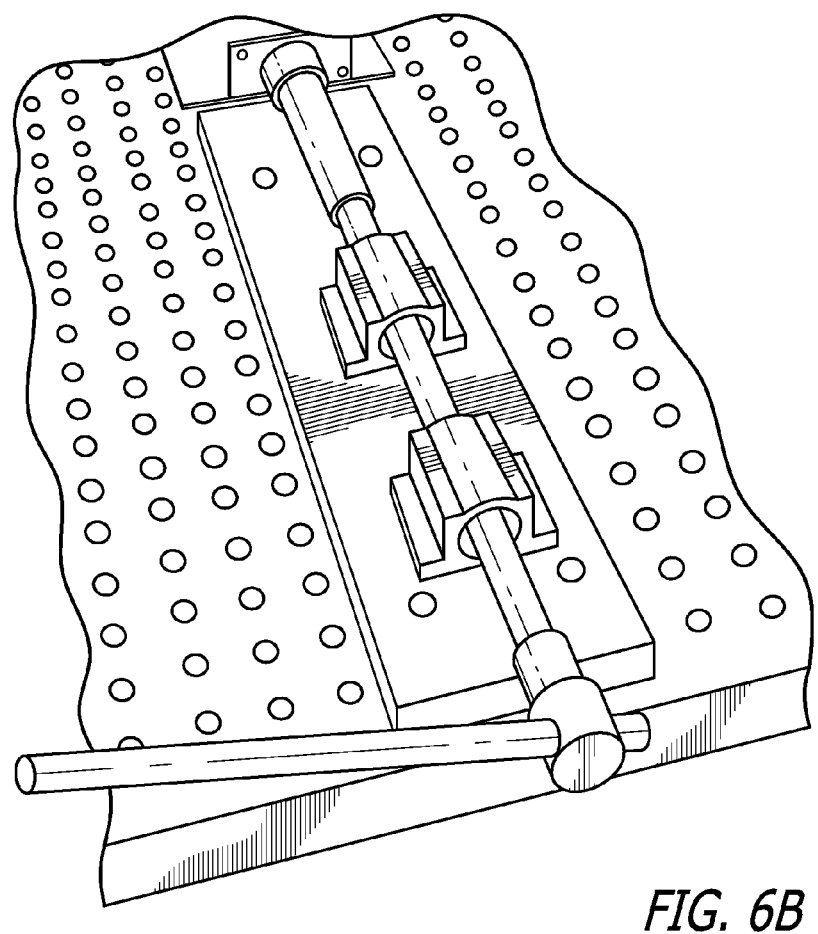
FIG. 6B shows the entire structure system that consists of a static member connected to a porous foam torque tube via a rigid rod, and on the other end a moment arm is connected with a static load.

A manufactured article displayed in FIG. 6, has both a tubular body and two hexagonally shaped ends consisting of open-celled porous TiNi. The hexagonally shaped ends of the torque tube fit snugly into a simple socket-set fitting, as seen in FIG. 6a, which then allows for a rapidly set and secure connection between the torsional actuator and an applied load. In FIG. 6b, there was a 85 in-lb torque applied via a 17" lever arm and a 6 lb load.

Figure 7:
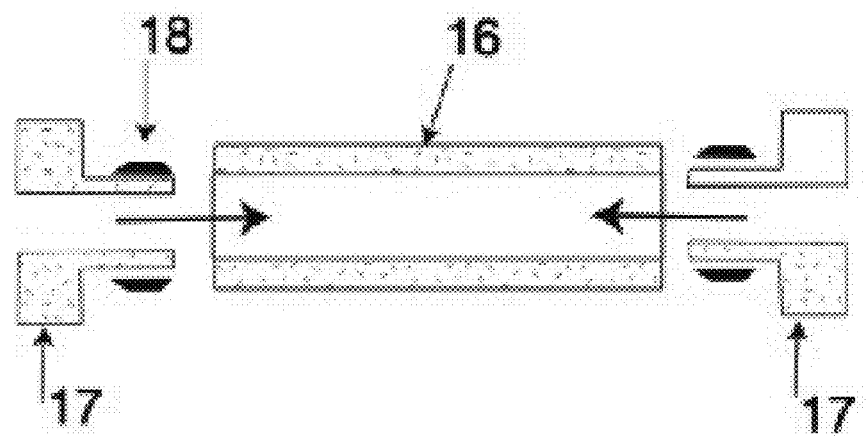
FIG. 7 is a schematic of an embodiment in which the porous actuator is made from a central porous SMA tube with two non-contiguous ends that are adhered into place. The ends can be made of porous TiNi foam or some different material than the central section.

FIG. 7 shows a schematic of an alternative embodiment, where the ends do not need to be a continuous piece of the same structure. A tubular central member (16) is shown schematically without any integrated ends. An article was made as seen in FIG. 6; for the ends a square shape with a central tubular plug was made such that the tubular plugs fit into the central tube. In this embodiment, the plugs (17) were also made from porous TiNi, although not necessarily with enhanced Shape Memory Effect and not necessarily of the same composition. To attach the pieces mechanically, so that the mechanical loads between the actuator and the external structure are communicated effectively, the open celled pore structure at the interface is infiltrated with a strong adhesive (18), such as an epoxy, cyanoacrylate or other adhesive with a suitable viscosity that it can penetrate the pore structure adequately. The pieces are then placed into their desired positions and the pieces are bonded mechanically as the adhesive cures. This arrangement is not preferred for applications involving high loads, as the adhesive becomes a part of the load path, but is suitable for applications involving low shearing loads. Methods to connect the actuator to the load path and means of heating the actuator are similar to those demonstrated above for a continous torsional element.

Figure 8A:
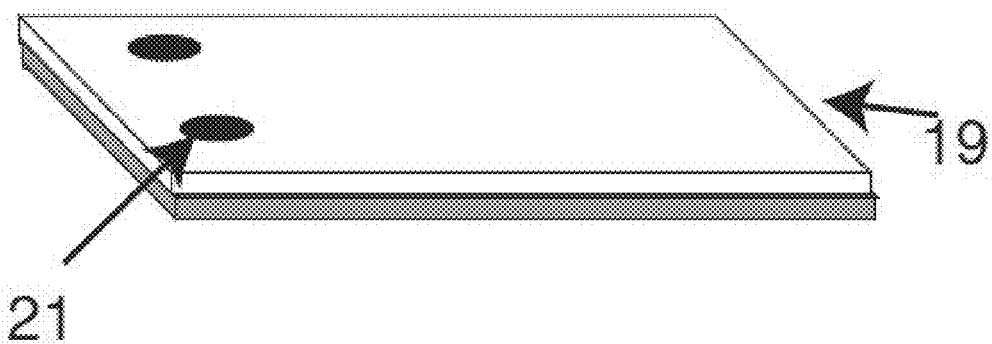
FIG. 8A is a schematic of an embodiment in which the porous SMA element is in the form of a flat sheet and is connected to an underlying static structure. A manifold of channels between the SMA element and the underlying static structure passes cold and hot gases and fluids.
Figure 8B:
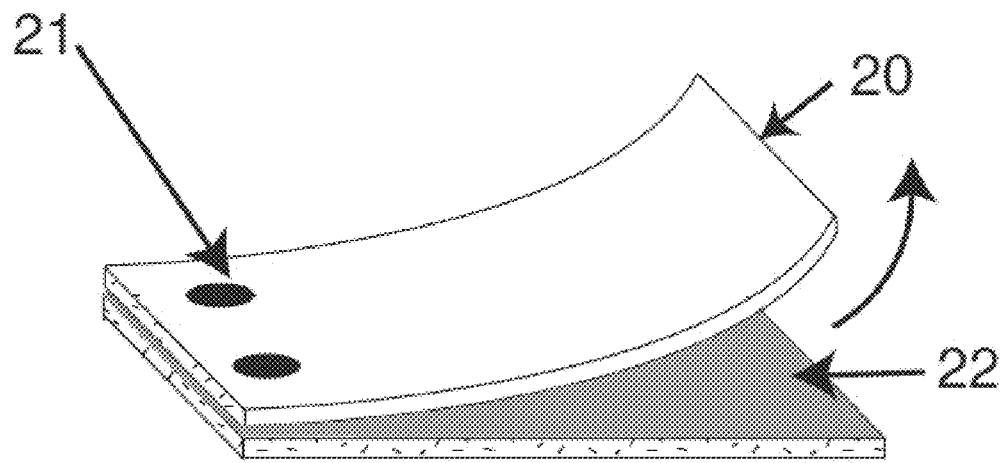
FIG. 8B is a schematic showing the deflection of the porous SME element away from the static structure.

FIG. 8 depicts a porous TiNi foam that is nominally planar (19). In this example, a cold planar section will deform into a curved section (20) on the application of heat. By adding holes (21) into the planar actuator, attachment onto an external statis structure (22) is made fascile. The holes formed as a mold feature in the SHS process, or added by grinding, drilling or some other means. Similarly, by adding cuts into the planar sheet, cantilevered elements can be fashioned from the sheet. The advantage here is that the cantilevered elements can be controlled individually, allowing for a variety of actuators to be fashioned from the same sheet.

Figure 9:
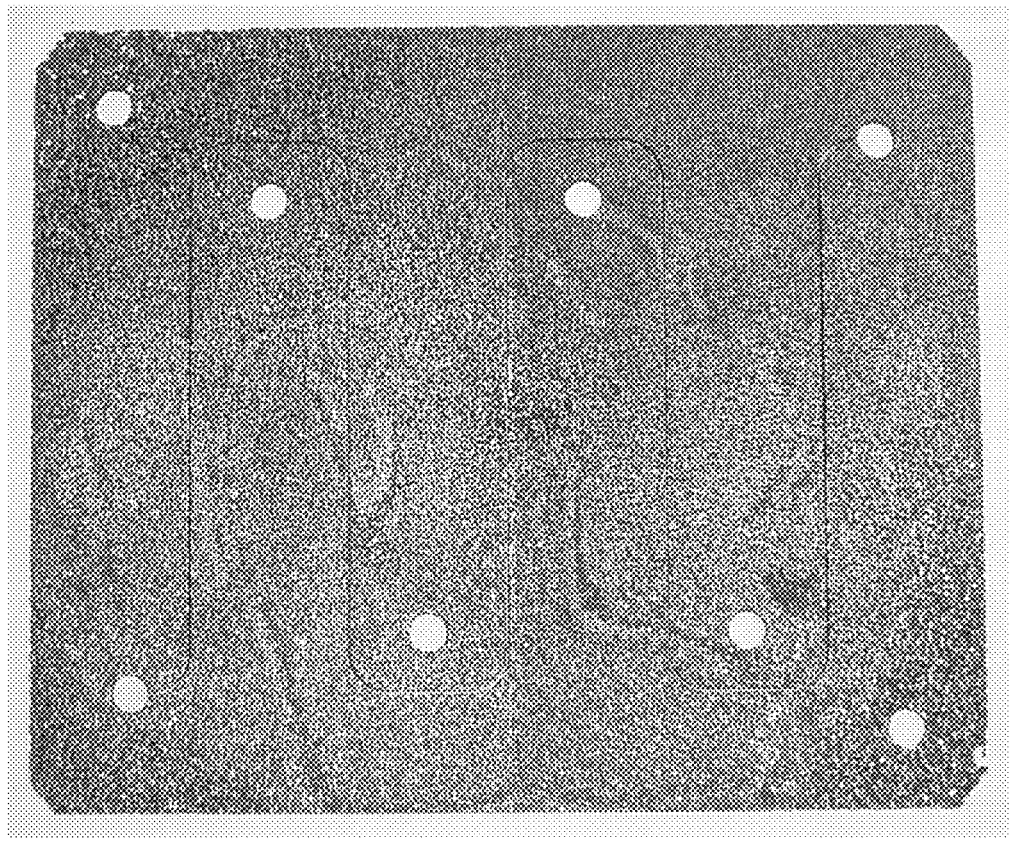
FIG. 9 is a photograph of a planar SME element, in which holes were added to connect to an underlying structure or to a structure to be moved. A serpentined cut in the foam generated 4 independently controllable cantilevered elements.

FIG. 9 is as micrograph of a planar SME element, in which holes were added to connect to an underlying structure or to a structure to be moved. A serpented cut in the foam generated 4 independently controllable cantilevered elements.

I claim:

1. Open-celled porous foam actuator, made up, at least in part, of a material possessing a shape change memory effect comprising:
    at least one geometrical connector shape integral to the porous foam actuator suitable for connecting the porous foam actuator article to a load path using a mating coupler;
    wherein the porous foam actuator is of a predetermined cross-section and a predetermined outer diameter for generating a predetermined load, the porous foam actuator has a deflection of a predetermined length, and the porous foam actuator includes at least one aperture of a predetermined diameter through which fluids and gases may flow, the predetermined diameter selected to minimize heating time and cooling time of the porous foam actuator.

2. The article in claim 1 wherein the porous foam actuator provides a rotary torsional urging.

3. The article in claim 1, wherein said porous actuator provides an urging by deflection of one of end out of an unloaded shape.

4. A system for attaching an open-celled porous foam actuator made up, at least in part, of a material possessing one of a shape change memory effect, to a structure including a static structural element and a movable structural element, the system comprising:
    the porous foam actuator comprising a plurality of connected geometric shapes, and the porous foam actuator placed in a load path between the moveable structural element and the static structural element and
    a mating coupler between the structure and the porous foam actuator for communicating a load between the structural element and the moveable element.

5. The system in claim 4, wherein the mating coupler fits over an external shape of the porous foam actuator.

6. The system in claim 4, wherein the mating coupler fits within an internal shape of the porous foam actuator.

7. The system in claim 4, wherein the porous foam actuator comprises a cylindrical tube with two connector shapes that each engage the load by fitting within the mating coupler, and where the porous foam actuator has a continuous inner diameter throughout its volume.

8. The system in claim 4, wherein the porous foam actuator comprises a cylindrical tube with two square connector shapes that engage the load by sliding into a square internal volume of the mating coupler.

9. The system in claim 4, wherein the porous foam actuator comprises a cylindrical tube with two hexagonal connector shapes that engage the load by sliding into a hexagonal internal volume of the mating coupler.

10. The system in claim 4, wherein the porous foam actuator comprises a cylindrical tube with a connected geometrical shape that engages the load by sliding into a mating coupler of a similar geometrical shape.

11. The system in claim 4, wherein the porous foam actuator comprises flat sheet incorporating a plurality of holes for attachment of the porous foam actuator to the structure.

12. The system of claim 11, further comprising cuts in the flat sheet to form a plurality of cantilevered structures to communicate force to the structure.

13. The system of claim 11 further comprising cuts in the flat sheet to form a plurality of cantilevered structures to deform out of the flat sheet, wherein as cantilevers deform the flow of fluids or gas moving across the sheet is altered.

14. A system for providing rapid cycle times in shape memory effect actuators to effect a structure comprising a first structural element and a second structural element, where the first structural element is fixed and the second structural element is movable, comprising:
    a porous foam actuator which exhibits a shape memory effect, said porous foam actuator being composed of at least two geometrical shapes, and with an internal void that extends through the porous foam actuator, the porous foam actuator placed in a load path between the first structural element and the second structural element;

mating couplers which fit onto the porous foam actuator, with a first mating coupler connected to the first structural element and a second mating coupler connected to the second structural element; and at least one valve connected to at least one of the mating couplers, the at least one value to control transfer of a selected one of (a) hot and cold gases and (b) hot and cold fluid into the internal void such that the selected one of gases and fluids are forced through the open-celled foam, thereby increasing heat transfer.

15. The system of claim 14, wherein the porous foam actuator comprises a cylindrical tube, and wherein the at least two geometric connector shapes include holes to allow the transfer of the selected one of gases and fluids into the internal volume of the cylindrical tube.

16. The system of claim 14, wherein at least one of the two mating couplers is joined to a one-way check valve for allowing the flow of the selected one of gases and fluids into the internal void of the porous foam actuator.

17. The system of claim 14, wherein one of the two mating couplers is joined to at least one externally controlled valve for allowing the flow of the selected one of gases and fluids into the internal void through a first entrance to the internal void, and a separate externally controlled valve to allow for the flow of the selected one of gases and fluids into the internal void through a second entrance.

18. The system of claim 14, wherein one of the two mating couplers is joined to a plurality of externally controlled valves to control flow of gases and fluids into the internal void through one entrance into the internal void of the porous foam actuator.

19. A system for providing rapid cycle times in shape memory effect actuators to effect a structure comprising a first structural element and a second structural element, where the first structural element is fixed and the second structural element is movable, comprising:

a porous foam actuator that exhibits shape memory effect, the porous foam actuator composed of at least two geometrical shapes and including an internal void which extends through the inside of the porous foam actuator, wherein the porous foam actuator is placed in a load path between the first structural element and the second structural element;

at least one seal attached to at least one surface of the porous foam actuator, the seal including a plurality of channels forming a manifold to direct the flow of selected one gases and fluids onto the porous foam actuator;

mating couplers which fit onto the porous foam actuator, with a first mating coupler connected to the first structural element and a second mating coupler connected to the second structural element; and a series of valves connected to the mating couplers, the series of valves for controlling transfer of the selected one of gases or fluids into the internal void such that the selected one of the gases and fluids are forced through the porous foam actuator.

20. The system of claim 19, wherein the manifold is connected to the series of valves which direct the selected one of gases and fluids into the manifold.

21. The system of claim 19, wherein the manifold is connected to the series of valves which directs the selected one of gases and fluids through the porous foam actuator.

22. The system of claim 19, wherein the seal comprises an elastomer which is formed with a plurality of channels and a backing plate of flexible metal.

\* \* \* \* \*

UNITED STATES PATENT AND TRADEMARK OFFICE
CERTIFICATE OF CORRECTION

| | | |
|---|---|---|
| PATENT NO. | : 9,010,106 B2 | Page 1 of 1 |
| APPLICATION NO. | : 13/475931 | |
| DATED | : April 21, 2015 | |
| INVENTOR(S) | : Jardine | |

It is certified that error appears in the above-identified patent and that said Letters Patent is hereby corrected as shown below:

In the claims,

Column 8, line 10: the portion of claim 3 reading "porous actuator" should read --porous foam actuator--.

Column 8, line 19: delete the word "and".

Column 8, line 47: "comprises flat sheet" should be changed to --comprises a flat sheet--.

Column 9, line 6: replace "value" with --valve--.

Signed and Sealed this
Thirteenth Day of October, 2015

Michelle K. Lee
*Director of the United States Patent and Trademark Office*